United States Patent Office 3,443,485
Patented May 13, 1969

3,443,485
PISTON FOR A PNEUMATIC OR HYDRAULIC CYLINDER
Marinus van Dranen, Leeuwarden, Netherlands, assignor to N.V. Machinefabriek A. Bijlenga, Leeuwarden, Netherlands, a limited-liability corporation of the Netherlands
Filed June 19, 1967, Ser. No. 646,821
Claims priority, application Netherlands, June 29, 1966, 6609024
Int. Cl. F16j 1/00, 9/08
U.S. Cl. 92—181          12 Claims

ABSTRACT OF THE DISCLOSURE

For use in a hydraulic or pneumatic cylinder, a piston having an annular flexible packing engageable with the walls of the cylinder, and means responsive to fluid pressure in the cylinder for moving the packing inwardly to decrease contact with the cylinder walls upon movement of the piston in the cylinder. A second annular packing and associated pressure responsive means is similarly provided around the piston in underlying relation to the first packing. Depending on the direction of movement of the piston in the cylinder, the packing adjacent the low pressure side of the piston will be moved inwardly away from the wall of the cylinder by the associated pressure responsive means while the other packing will experience a radially inward force from the associated pressure responsive means that will tend to balance radial outward forces on the packing exerted by fluid pressure on the high pressure side of the piston to prevent increased contact between the packing and the cylinder wall.

---

Figure 1:
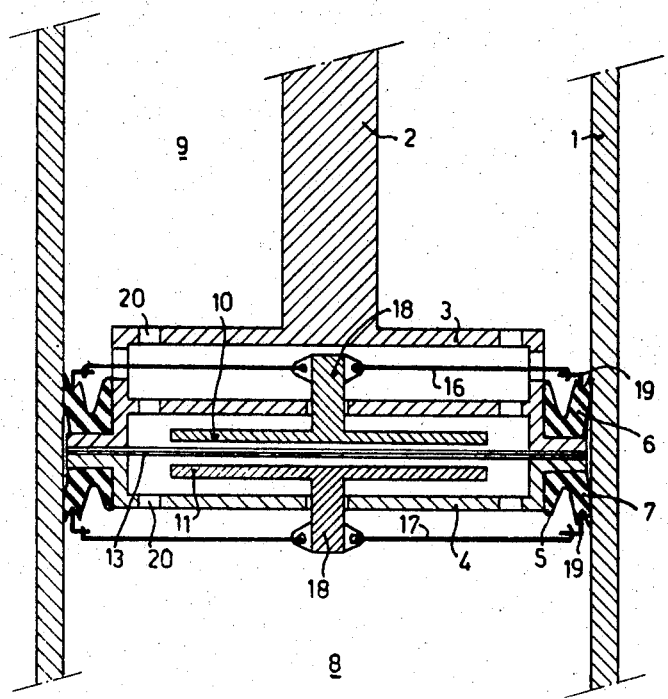

The invention relates to a piston for a pneumatic or hydraulic cylinder with sealing bushes, the lip-shaped portion of which engages the wall of the cylinder.

From the existing constructions and literature many possibilities are known to obtain a sealing of pistons for pneumatic or hydraulic cylinders. For this may be thought, i.e., of O-rings and bushes, of which sealing elements can be formed in many ways.

With all these constructions the sealing effect is obtained by the pressure of the driving medium pressing the elastic material of the bush against the cylinder wall. To obtain a beginning of the sealing, these sealing elements engage the cylinder wall with a certain pretension, when the pressures at both sides of the piston are equal.

Double acting pistons have at both sides of the piston a sealing element, which consequently both are pressed against the cylinder wall with pretension and of which one, viz., the sealing element, at the side of the piston where the pressure of the driving medium is the highest, is pressed against the wall by this pressure, thus becoming the total pressure against the wall the sum of said pretension and the pressure as a consequence of the increase of pressure of the driving medium.

The pressure of the sealing elements engaging the cylinder wall is different for a stationary and a moving piston. In the latter case a frictional force is excited between the sealing element and the cylinder wall. If during the displacement of the piston the portion engaging the wall is situated before the piston, the pressure of said element against the wall will be increased by this frictional force, however, if said portion is situated behind the piston, same will be decreased. At an increase of the pressure of the driving medium, the pressure of the sealing element against the cylinder wall and by means of this the friction increases in proportion with the difference of pressure of the driving medium before and behind the piston. However, in almost all cases the elastic material of the sealing element will bend by the pressure of the pressure medium, thus the contact surface between the piston and the cylinder wall will become greater. In addition the pressure of the sealing element against the cylinder wall will increase by means of the product of the surface enlargement and said difference of pressure, which can be decreased with the force necessary for the elastic formation of the sealing element.

It will be clear that the useful power which can be provided by the piston and as a consequence by the piston shank, is equal to the force excited to the piston by the driving medium reduced with the friction of the piston and the cylinder wall and the friction of the piston rod in the stop bush.

The invention has an object to decrease the friction of the piston against the cylinder wall, as well as thereby increasing the efficiency of the pneumatic or hydraulic cylinder and is characterized in that the piston is provided with a pressure system which is movable under pressure of the medium axially with respect to the piston shank, as well as with a connecting system which is disposed with respect to the stationary piston shank, the pressure system and the lip-shaped bush portions such that the lip-shaped portion of the sealing bush is taken away from the cylinder wall in radial direction during the displacement under pressure of the pressure system at the piston side which is not under pressure. As a rule double acting cylinders having only one operating sealing element whereby the other one, which engages the wall with pretension, only the friction is increased, as already described above. The friction is thus decreased by means of the construction according to the invention by loosening this latter sealing element completely from the wall, whereby the total friction of the piston becomes equal to the friction of the one active sealing element.

An additional advantage of the construction according to the invention is the fact that by the sealing element which is taken away from the wall, the oil for the lubrication of the piston is not scraped off in front of it. With the known constructions, in which the scraping sealing element is pressed against the wall with the normal pretensions, the oil for the lubrication of the active element is just scraped away by said element. With the construction according to the invention this is prevented by taking this element away from the cylinder wall, so that by means of this a very good lubrication of the sealing element takes place, because also by the wedge shaped space, which is formed between the sealing element and the cylinder wall, the oil film along the wall will not be interrupted.

A preferred embodiment of the invention is further characterized in that said connection system is also disposed such that thereby during the displacement under pressure of the pressure system it is prevented that the lip shaped portion of the sealing bush at the side of the piston which is under pressure is pressed by the medium in radial direction against the cylinder wall. So it is prevented that by the pressure or at an increase of the pressure of the driving medium the contact face between the sealing element and the cylinder wall is enlarged, so that thereby the extra increase of the friction as a consequence of this surface enlargement will fail to come. This can be used both for single acting and double acting cylinders.

Figure 2:
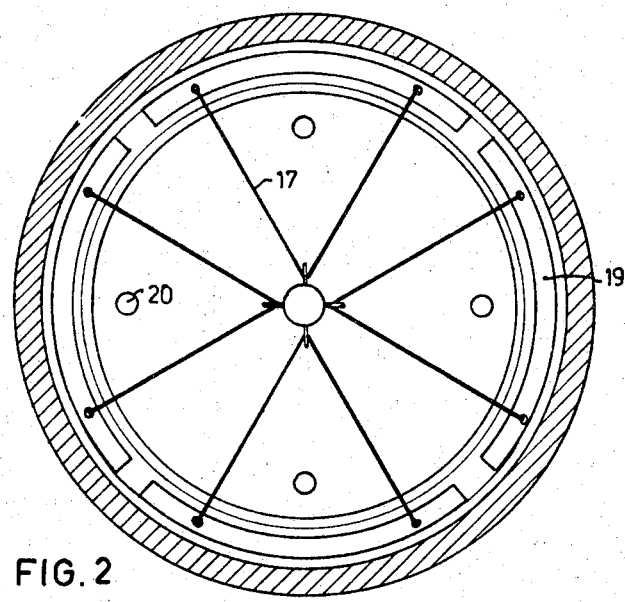
Figure 3:
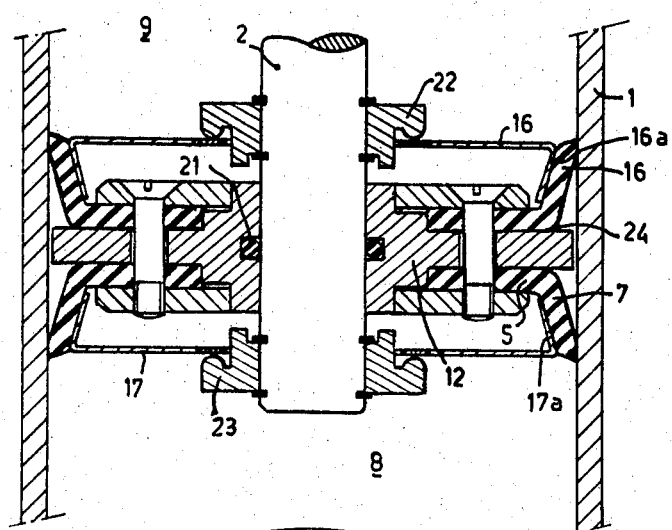
Figure 4:
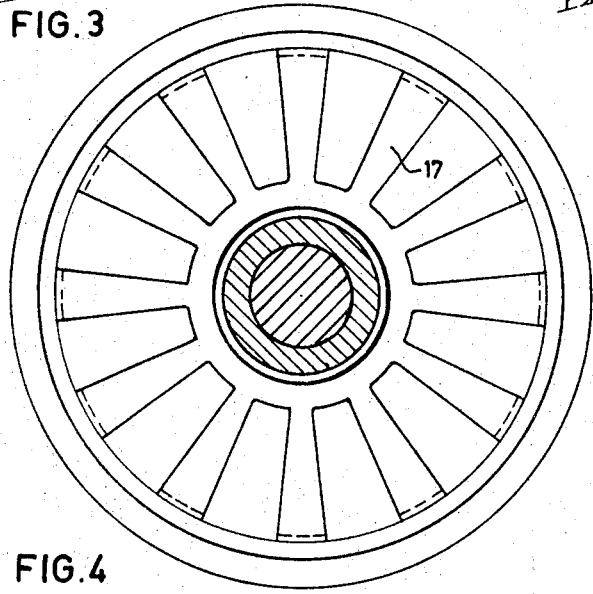
Figure 5:
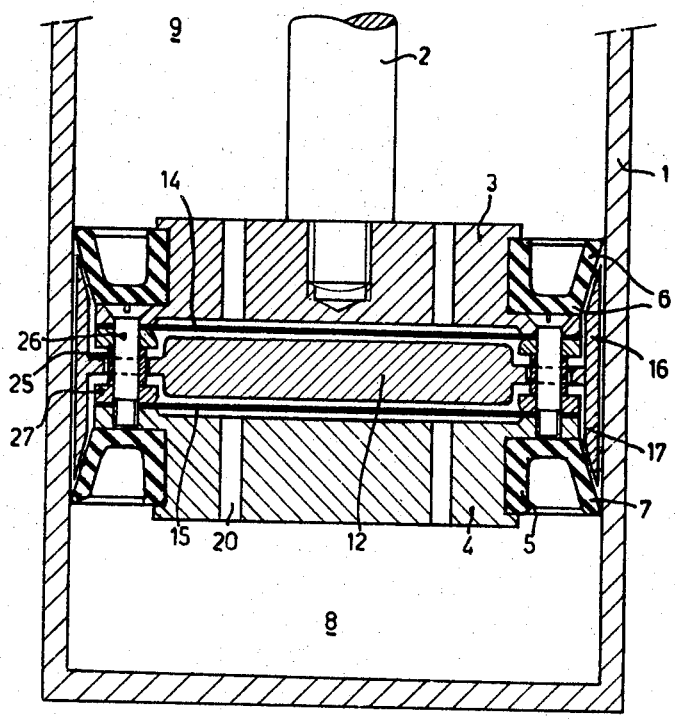

The invention will hereafter by means of some embodiments reproduced in the drawings be elucidated.
FIGURES 1, 2 show a first embodiment.
FIGURES 3, 4 show a second embodiment.
FIGURE 5 shows a third embodiment.

Corresponding parts are indicated in the figures with the same reference numerals.

In FIGURES 1 and 2 numeral 1 represents the cylinder wall, 2, the piston shank and 3 and 4 both portions of the hollow piston. Fixedly connected to these piston portions 3, 4 are the sealing bushes 5 of which the lip shaped parts 6, 7 engage the cylinder wall under pretension.

The spaces below and above the piston are indicated by 8 and 9 respectively.

In the hollow space between both piston portions 3 and 4 is disposed a pressure system consisting of two pressure plates 10 and 11, which are mounted at both sides of a membrane 13 and are displaceable by means of guiding pins 18 in axial direction with respect to the piston shank 2.

This pressure system is connected to the lip shaped bush portions 6, 7 by means of a connection system which consists of the connecting rods, 16, 17 and the segments 19, which are connected to the free extremities of the guiding pins 18, said connecting rods 16, 17 and segments 19 having a rectangular section and being disposed in the lip shaped bush portions.

When the space 8 is brought under pressure, this pressure will propagate through the holes 20 to the membrane 13. By means of this pressure, portion 10 will displace along the centerline. Initially, i.e., before space 8 was brought under pressure, connecting rods 16 were at a right angle to the centerline of the cylinder. After the displacement of the portion 10, they are at another angle to the centerline, whereby the segments and therewith the elastic sealing elements are drawn off the cylinder wall. By means of this is obtained that the nonoperating sealing element, never causes friction. At the side 8, whereby the pressure of the driving medium the sealing element is pressed against the wall, segments 19 and connecting rods 17 take care that limits are set to the bending of that element, so that at increasing pressure in the space 8, the bending of the lip shaped bush portion 7 will be brought to a stand, whereby no enlargement of the contact surface between the sealing element and the cylinder wall takes place.

A second embodiment is reproduced in FIGURES 3 and 4. In this embodiment the piston consists of a thrust dish 12, to which the sealing bushes 5 are fixed. Said thrust dish 12 with the brushes 5 is adapted to move as a whole over the piston shank 2. The sealing between the piston and the piston shank is provided by the sealing ring 21.

Lips 16a, 17a of the rims 16, 17 functioning as connection system are fixedly connected to the lip shaped bush portions 6, 7, e.g., by vulcanisation or normal stickink. These lips are towards the middle connected into a ring.

If now the pressure is increased in the space 8, the piston or thrust dish washer 12 will move as a whole over the piston shank 2, so that the ring shaped portion of the rim 16 pushes against the ring 22 which is fixedly attached on the piston shank. As the piston will move still farther, viz., until it engages said ring 22, the lips, which initially were at right angles to the centerline of the cylinder, will then come at an inclined angle. As the lips of the spring steel rim 16 are manufactured with such a strength that no remarkable bending appears, the sealing element attached thereto will be drawn off the wall, of which the vertical lip shaped portion 6 will pivot about point 24.

Again the lips and the ring of rim 17 also will set a limit to the bending of the sealing element, 7, thus giving as a whole the same result as with the first example.

A third embodiment is shown in FIG. 5. In this figure 1 again represents the cylinder, 5 the sealing bushes with the lip shaped sealing elements 6 and 7, whereas the piston consists of two portions 3 and 4. In this embodiment the pressure system consists of the thrust dish 12 and both the membranes 14, 15 which are disposed at both the sides of the thrust washer. The connection system is integrated with the pressure system and consists of both the flanges 16, 17 at the outer side of the thrust dish 12, which extend outwardly obliquely, at their extremity.

When the pressure in the space 8 is increased, this pressure will propagate via the holes 20 into the part 4 until below the membrane 15. By means of this pressure will raise the thrust dish 12. Because the thrust dish 12 moves along the centerline of the cylinder, the sealing element 6 will be pressed off the cylinder wall 1 by the oblique plane of the cylindric flange of the thrust dish 12. By the other extremity of the cylindric flange 17 the bending of the sealing element 7 will be restricted again.

The box shaped portion 3 and 4 of the piston are interconnected via the distance piece 25, of which a plurality, e.g., twelve are regularly spaced over the periphery with same angles, by means of the bolts 26. The membranes are clamped fixedly against the piston portions 3 and 4 respectively by the rings 27.

What is claimed is:

1. For use in a hydraulic or pneumatic cylinder or the like, a piston having an annular packing engageable with the wall of the cylinder, means mounting said packing for radial movement outwardly and inwardly towards and away from the wall of the cylinder, and means responsive to fluid pressure in the cylinder for moving the packing radially inwardly in a direction away from the wall of the cylinder upon movement of the piston in the cylinder.

2. The piston defined in claim 1 further including a second annular packing mounted generally concentric with said first packing for radial movement outwardly and inwardly towards and away from the cylinder wall, and means responsive to fluid pressure in the cylinder during movement of the piston in the cylinder for exerting a radially inward force on said second packing whereby the packing adjacent the low pressure side of the piston will be moved away from the cylinder wall while the packing adjacent the high pressure side of the piston will not undergo increased engagement with the cylinder wall resulting from the fluid pressure in the high pressure side of the cylinder.

3. The piston defined in claim 2 further including a piston rod, and wherein said piston includes a body fixed to the piston rod to move therewith as a unit, and said packings are fixed to said piston body to move together with the piston body and rod in the fluid cylinder.

4. The piston defined in claim 3 wherein said piston body is hollow, said first and second packings are secured to the periphery of said piston body, and there is further included a number of ports extending through the wall of said piston body to permit fluid pressure to enter into said piston body, and wherein said first and second pressure responsive means includes a pressure responsive member secured in said piston body for axial movement in response to fluid pressure, a pair of pressure plates located in the piston body on opposite sides of said pressure responsive member to be movable axially by said pressure member, and means interconnecting said pressure plates and said packings respectively such that axial movement of said pressure plates will result in forces tending to move the packings radially inwardly.

5. The piston defined in claim 4 wherein said means interconnecting said pressure plates and the packings include axially projecting stem portions fixed to said pressure plates respectively, guide means in said piston body for guiding and maintaining said stems in the axial direction of said piston, and a number of radially extending rods interconnecting said stems and said packings.

6. The piston defined in claim 2 further including a piston rod and packing mounting means mounting said packings around said piston rod for axial movement relative to the rod.

7. The piston defined in claim 6 wherein both said pressure responsive means include a pair of radially extending resilient members respectively fixed at their outer ends to the packings and connected at their inner ends to the piston rod to move with the piston rod for undergoing deflection for moving the associated packings inwardly from the wall of the cylinder.

8. The piston defined in claim 7 further including a pair of rings fixed about said piston rod for movement therewith on opposite sides of said resilient members, said rings being engageable with the inner portions of said resilient members respectively upon movement of the piston rod to deflect the resilient members for moving the associated packings inwardly from the cylinder wall.

9. The piston defined in claim 2 wherein said packings are secured to the periphery of said piston body to be movable therewith axially in the fluid cylinder, and wherein said piston body contains an internal space, said piston body having a number of ports for permitting fluid from the cylinder to move into said space, and cam means fixed to said pressure responsive member to be movable therewith for camming inwardly one of said packings depending on the direction of movement of the piston in the cylinder.

10. The piston defined in claim 9 wherein said cam means comprises an annular member located between said one packing and the wall of the cylinder and having an inclined cross-section at its extremity for camming said one packing inwardly upon movement relative thereto in response to fluid pressure against said pressure responsive member.

11. The piston defined in claim 10 wherein said annular cam member has a sufficient axial dimension such it extends between the other packing and the wall of the cylinder to prevent said other packing from being forced into increased contact with the cylinder wall by fluid pressure on the high pressure side of the piston upon movement of the piston in the cylinder.

12. The piston defined in claim 11 wherein said piston body comprises a pair of axially spaced body members and means securing said body members for movement together and with said pressure responsive member located therebetween, and wherein said pressure responsive means include a pair of diaphragms fixed between said body members on opposite sides of said pressure responsive member to be engageable with said pressure responsive member.

References Cited
UNITED STATES PATENTS

| | | | |
|---|---|---|---|
| 564,257 | 7/1896 | Ross | 92—247 X |
| 748,233 | 12/1903 | Swan | 92—247 |
| 2,274,304 | 2/1942 | Perry | 92—194 |
| 2,366,832 | 1/1945 | Christenson | 92—194 X |
| 2,977,167 | 3/1961 | Barnhart | 92—247 X |

CARROLL B. DORITY, Jr., *Primary Examiner.*

U.S. Cl. X.R.

92—194, 244